(12) United States Patent
Hoshino et al.

(10) Patent No.: US 7,284,023 B2
(45) Date of Patent: Oct. 16, 2007

(54) DATABASE MANAGEMENT METHOD AND APPARATUS FOR ADDRESSING TO TRANSACTION COMPLETION FROM/IN A STORED PROGRAM WRITTEN IN AN INTERPRETED LANGUAGE AND AN IMPLEMENTING PROGRAM THEREFOR

(75) Inventors: Shinichi Hoshino, Tokyo (JP); Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 333 days.

(21) Appl. No.: 10/028,823

(22) Filed: Dec. 28, 2001

(65) Prior Publication Data

US 2002/0178144 A1    Nov. 28, 2002

(30) Foreign Application Priority Data

May 25, 2001  (JP) .............................. 2001-156289

(51) Int. Cl.
*G06F 12/00* (2006.01)
*G06F 17/30* (2006.01)
*G06F 9/46* (2006.01)

(52) U.S. Cl. ...................................... 707/206; 718/107
(58) Field of Classification Search ................ 707/206; 718/107
See application file for complete search history.

(56) References Cited

U.S. PATENT DOCUMENTS 5,845,117 A * 12/1998 Fujita ......................... 718/107
6,006,235 A    12/1999 Macdonald et al.
6,225,995 B1 * 5/2001 Jacobs et al. ................ 345/738

OTHER PUBLICATIONS

SQLJ-Part 1: SQL Routines using the JAVA™ Programming Language, SIGMOD Record, vol. 28, No. 4, Dec. 1999, pp. 58-63.
Melton et al SQLJ-Part 1 (SQL Routines using the JAVA™ Programming Language) in Understanding SQL and JAVA Together, pp. 183-217.

* cited by examiner

*Primary Examiner*—Don Wong
*Assistant Examiner*—Cheryl M Shechtman
(74) *Attorney, Agent, or Firm*—Mattingly, Stanger, Malur & Brundidge, P.C.

(57) ABSTRACT

In an efficient database management method, a program beforehand defined and registered to a database is invoked by a request to execute database processing. An inputted query request is analyzed to generate an execution module for executing it. When a program not contained in the module is invoked at execution of the module, resources predetermined for use by programs are classified into resources to be set as unavailable resources until a transaction is completed in another program and resources to be set as resources unavailable to other programs until the programs are terminated. When a transaction completion request is received from a program, any resource set as an unavailable resource until the transaction is completed in the program is set as an available resource. Any resource set as unavailable resource until a program associated therewith is terminated is set as an available resource when the program is terminated.

3 Claims, 4 Drawing Sheets

DATABASE MANAGEMENT METHOD AND APPARATUS FOR ADDRESSING TO TRANSACTION COMPLETION FROM/IN A STORED PROGRAM WRITTEN IN AN INTERPRETED LANGUAGE AND AN IMPLEMENTING PROGRAM THEREFOR

BACKGROUND OF THE INVENTION

The present invention relates to a database management technique, and in particular, to a technique to manage a database resource when a program is activated according to a processing request to execute database processing.

A database language "structured query language (SQL)" has a function to call, as a routine, functions and procedures defined by a user. The functions and the procedures are analyzed when the routine is defined, and are registered to a database management system (DBMS) as an execution module related to a routine name. An execution module is produced as follows. A sequence of database processing procedures are analyzed to be converted into a format executable in the database management system. An execution module is also called "execution plan". When a routine call is issued and a routine name specified as information of the routine call, database processing is executed according to an execution module registered in association with the routine name.

On the other hand, an article "SQLJ-Part 1: SQL Routines using the Java Programming Language, SIGMOD Record, Vol. 28, No. 4, December, 1999" describes a function to execute, as a routine, a program written in the Java programming language. Java is a trademark or a registered trademark of Sun Microsystems, Inc. of the United States.

In this function, when a routine is defined, a program is registered in association with a routine name. In a routine call, a database management system executes a program in a program execution environment. When an SQL statement is issued, the program execution environment calls the database management system, and hence an execution module is generated and database processing is executed.

SUMMARY OF THE INVENTION

In an environment in which an SQL statement to be issued is determined when a program is executed in response to a routine call, an execution module is generated when the execution module is executed and a database resource to execute the SQL statement is also determined when the SQL statement is executed. The database resource includes, for example, a memory area necessary to execute the SQL statement and a cursor and a lock reserved to execute the SQL statement. Some items of the database resource must be kept reserved for the pertinent program until a transaction is completed. In the transaction completion, there is produced a sequence of SQL operations guaranteed as a minimum unit to recover a database. For a commit or rollback request, a transaction completion is carried out such that results of the database update by SQL statements occurring in the transaction are guaranteed or canceled.

In the above environment, the database resource necessary to execute SQL statements issued during the program execution is not under the control of the execution module to call a routine.

All items of the database resource are kept reserved until the transaction completion on the routine call side. When the transaction is completed, the items of the database resource are released at a time. As above, resources which to be used by other transactions are kept reserved for an unnecessarily long period of time, and hence the resource utilization efficiency is deteriorated in the overall system. To solve this problem, it is necessary to consider how to release the database resource related to an SQL statement issued during execution of a program.

U.S. Pat. No. 6,006,235 issued to Macdonald et al on Dec. 21, 1999 describes an approach and a method to execute, as a routine, a program described in an interpreter language such as the Java programming language. However, this patent does not mention the transaction completion during an execution of a program.

It is therefore an object of the present invention, which has been devised to solve the above problem, to provide a database management method and a database management system to appropriately release a database resource which can be used by another program.

To solve the problem, a database management method according to one aspect of the present invention comprises a process for use in structured query language (SQL) query, of addressing to a commit request or a rollback request in a stored program written in a different-type of language or an interpreted language, the process comprising the steps of: reserving a resource at execution of a query from a stored program in the interpreted language and keeping relational information between the reserved resource and resources already reserved in the query processing in execution having invoke the program; and releasing, at release of a transaction from the stored program, associated ones of resources according to the relational information kept in said reserving step.

According to another aspect of the present invention, there is provided a database management method in a relational database system for addressing to a commit request or a rollback request in a stored program written in a different-type of language or an interpreted language (JAVA), said method comprising the steps of: reserving a resource at execution of a query from a stored program of an interpreted language and keeping relational information between the reserved resource and resources already reserved in the query processing in execution having invoked the program; and releasing, at release of a transaction from the stored program, associated ones of resources according to the relational information kept in said reserving step. As a result, a database resource which can be used by another program can be appropriately released.

Other objects, features and advantages of the present invention will become apparent from the description of the following embodiments of the invention taken in conjunction with the accompanying drawings.

DESCRIPTION OF THE EMBODIMENTS

Description will be given of a database management system in an embodiment of the present invention in which a transaction completion can be conducted in a program.

Figure 1:
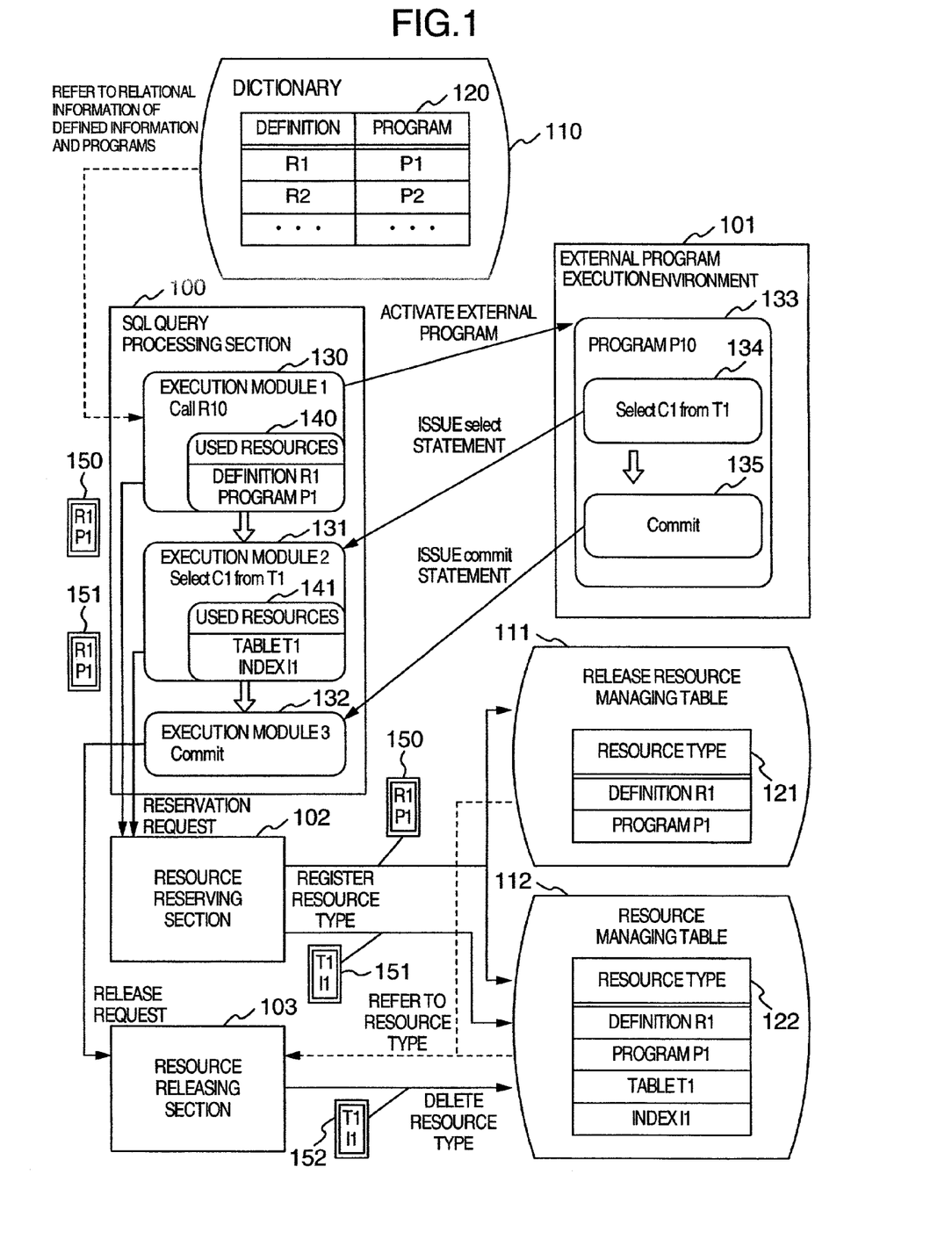
FIG. 1 is a block diagram showing a concept of the present invention.

First, a concept of the present invention will be briefly described by referring to FIG. 1.

In the database management system of the embodiment, a routine is executed by an SQL query processing section 100, an external program execution environment 101, a resource reserving section 102, and a resource releasing section 103 as shown in FIG. 1. The SQL query processing section 100 has a function to activate or to initiate an external program. In response to a routine call request from a user, the SQL query processing section 100 generates and executes an execution module 130. The section 100 accesses a dictionary in a dictionary information storage area 110 and refer to relational information associated with routines and programs to determine a program to be activated. The SQL query processing section 100 issues a reservation request to the resource reserving section 102, specifically, issues a reservation request including a resource type 150 as a parameter to reserve a resource 140 in association with a routine call. The resource reserving section 102 reserves the resource 140 and registers the resource type 150 to a release resource managing table 121 in a release resource management table storage area 111 and a resource managing table 122 in a resource managing table storage area 112. As a result of the above processing, the resource type 150 is registered as a currently reserved resource which cannot be released until the routine call is completely finished.

The SQL query processing section 100 activates, according to the relational information obtained from the dictionary 120, an external program 133 which is an entity of the routine. When the program 133 issues a select statement 134, the external program execution environment 101 issues an execution request to the SQL query processing section 100 to execute the select statement 134. According to the execution request, the SQL query processing section 100 generates and executes an execution module 131. In this operation, the section 100 issues a reservation request including a resource type 151 as a parameter to the resource reserving section 102 to reserve a resource 141 associated with execution of the select statement. The resource reserving section 102 reserves the resource 141 and registers a resource type 151 to the resource managing table 122 in the resource managing table storage area 112. As a result of the above processing, the resource type 151 is registered as a currently reserved resource.

When the program 133 issues a commit statement 135, the external program execution environment 101 issues a commit request to the SQL query processing section 100. The SQL query processing section 100 issues a resource release request to the resource release section 103. The section 103 refers to the release resource managing table 121 in the release resource management table storage area 111 and the resource managing table 122 in the resource managing table storage area 112 to determine a resource type 152 which can be released. The resource release section 103 deletes the resource type 152 from the resource managing table 122 in the resource managing table storage area 112. As a result of the above processing, the resource type 152 is released.

Figure 2:
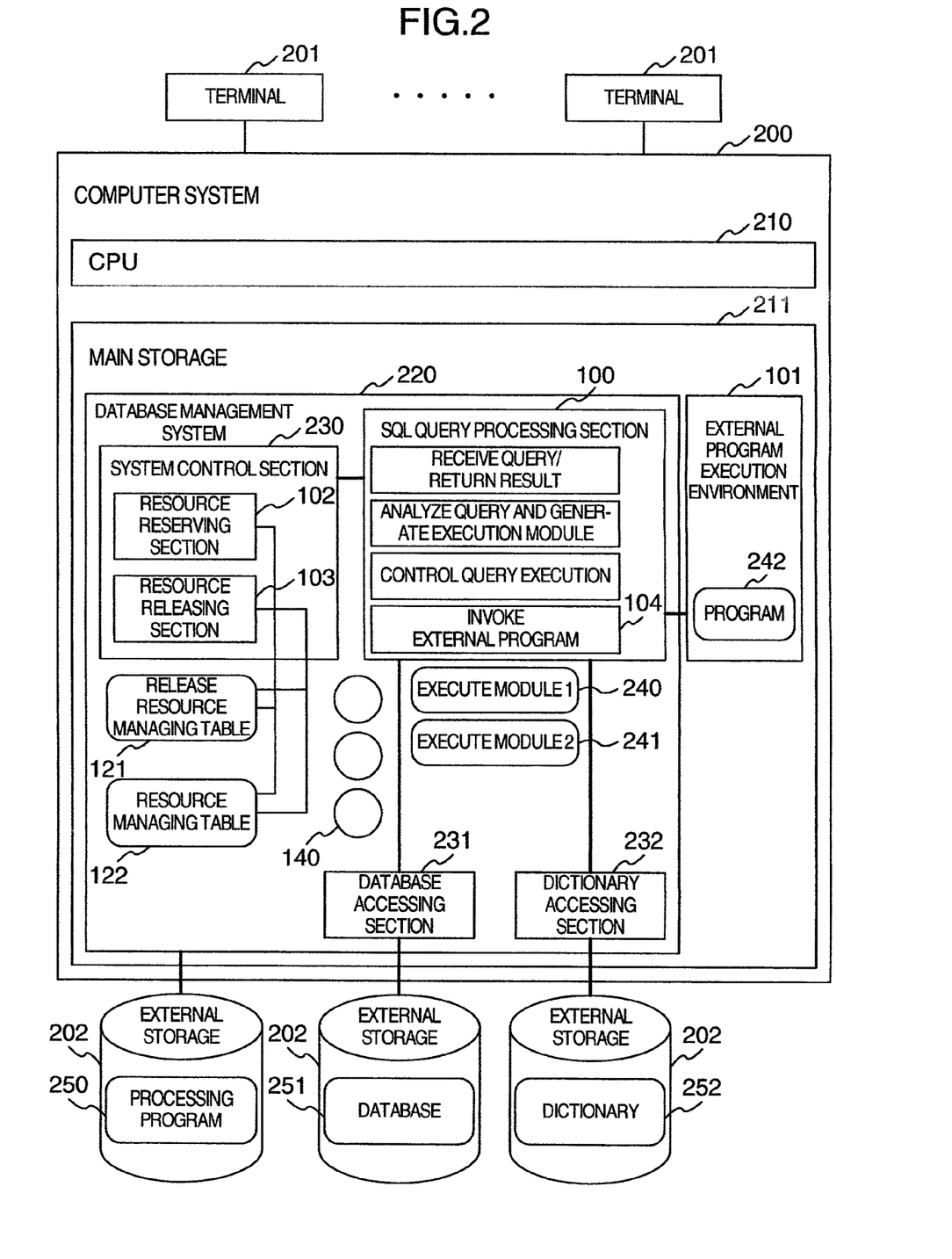
FIG. 2 is a schematic diagram showing functional blocks and a hardware configuration of a database management system in an embodiment according to the present invention.

Next, FIG. 2 shows functional blocks and a hardware configuration of a database management system in an embodiment.

In the configuration of FIG. 2, a computer system 200 includes a central processing unit (CPU) 210, a main storage 211, external storages 202 such as magnetic disk devices, and a large number of terminals 201. In the main storage 211, the database management system 220 and the external program execution environment 101 are disposed. The external storages 202 store a database 251 and a dictionary 252 managed by the database management system 220. Additionally, a processing program 250 to implement the database management system 220 and the external program execution environment 101 is stored also in the external storages 202.

The database management system 220 includes a system control section 230, an SQL query processing section 100, a database accessing section 231, and a dictionary accessing section 232. The system control section 230 includes a resource reserving section 102 and a resource releasing section 103. The resource reserving section 102 and the resource releasing section 103 operates the release resource managing table 121 and resource managing table 122. The SQL query processing section 100 has a function to activate an external program 104.

An SQL execution request issued by a user from the terminal 201 is executed as execution modules 240 and 241 in the SQL query processing section 100. When the requested SQL statement is a routine call, the section 100 issues a relational information acquisition request to the dictionary accessing section 232 to acquire information of a routine and the related program to be executed. The section 232 refers to relational information stored in the dictionary 252 acquires pertinent relational information, and returns the acquired information to the SQL query processing section 100. The section 100 activates a program 242 according to the relational information. The program 242 is executed in the external program execution environment 101.

The resource reserving section 102 in the system control section 230 reserves a resource necessary at SQL execution in the SQL query processing section 100 and registers a resource type to the release resource managing table 121 and the resource managing table 122. When a resource release request is received from the SQL query processing section 100, the resource releasing section 103 in the system control section 230 releases the resource, refers to the release resource managing table 121 and the resource managing table 122 to determine a resource to be released, and deletes the determined resource type from the resource managing table 122.

Figure 3:
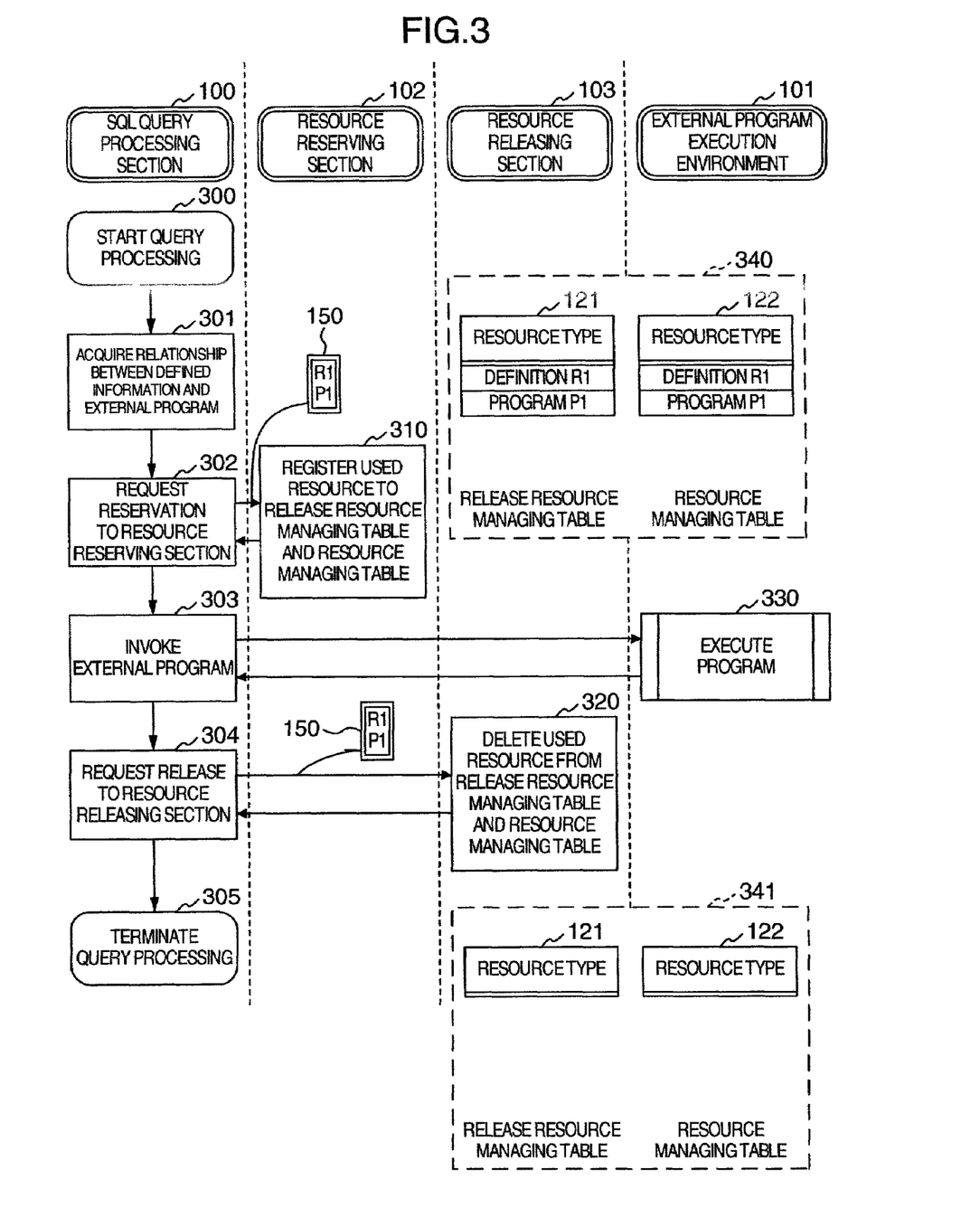
FIG. 3 is a flowchart showing a process of an SQL query processing section in an embodiment of the present invention to execute programs in an external program execution environment.

FIG. 3 shows, in a flowchart, processing procedures of the SQL query processing section 100 of the embodiment shown in FIG. 1 to executes an execution module 130 for a routine call requested by a user and to execute a program 133 in the external program execution environment 101. Steps 300 to 305 are executed by the SQL query processing section 100, step 310 is executed by the resource reserving section 102, step 320 is executed by the resource releasing section 103, and step 330 is executed by the external program execution environment 101.

First, in step 301, the SQL query processing section 100 refers to the dictionary 120 to acquire relational information of routines and programs. Next, in step 302, the section 100 passes as a parameter a resource type 150 for a routine call to the resource reserving section 102 to thereby issues a resource reservation request. In response thereto, the section 102 registers the acquired resource type 150 to the release resource managing table 121 and the resource managing table 122 in step 310. Resultantly, in each of the release resource managing table 121 and the resource managing table 122, "definition R1" and "program P1" are kept stored in association with the resource type 150 as indicated by reference numeral 340 in FIG. 3.

In step 303, the SQL query processing section 100 activates an external program according to the relational information acquired in step 301. The external program execution environment 101 executes the specified program. The program processing executed in step 330 will be described in detail by referring to FIG. 4.

After the program execution processing is finished, the SQL query processing section 100 passes as a parameter the resource type 150 for the routine call to the resource releasing section 103 to thereby issues a resource release request in step 304. In response thereto, the section 103 deletes the resource type 150 received as a parameter from the release resource managing table 121 and the resource managing table 122 in step 320. Resultantly, in the release resource managing table 121 and the resource managing table 122, the items of the resource type 150 are not stored as indicated by a reference numeral 341. In the above procedure, the program call processing is executed in the SQL query processing section 100.

Figure 4:
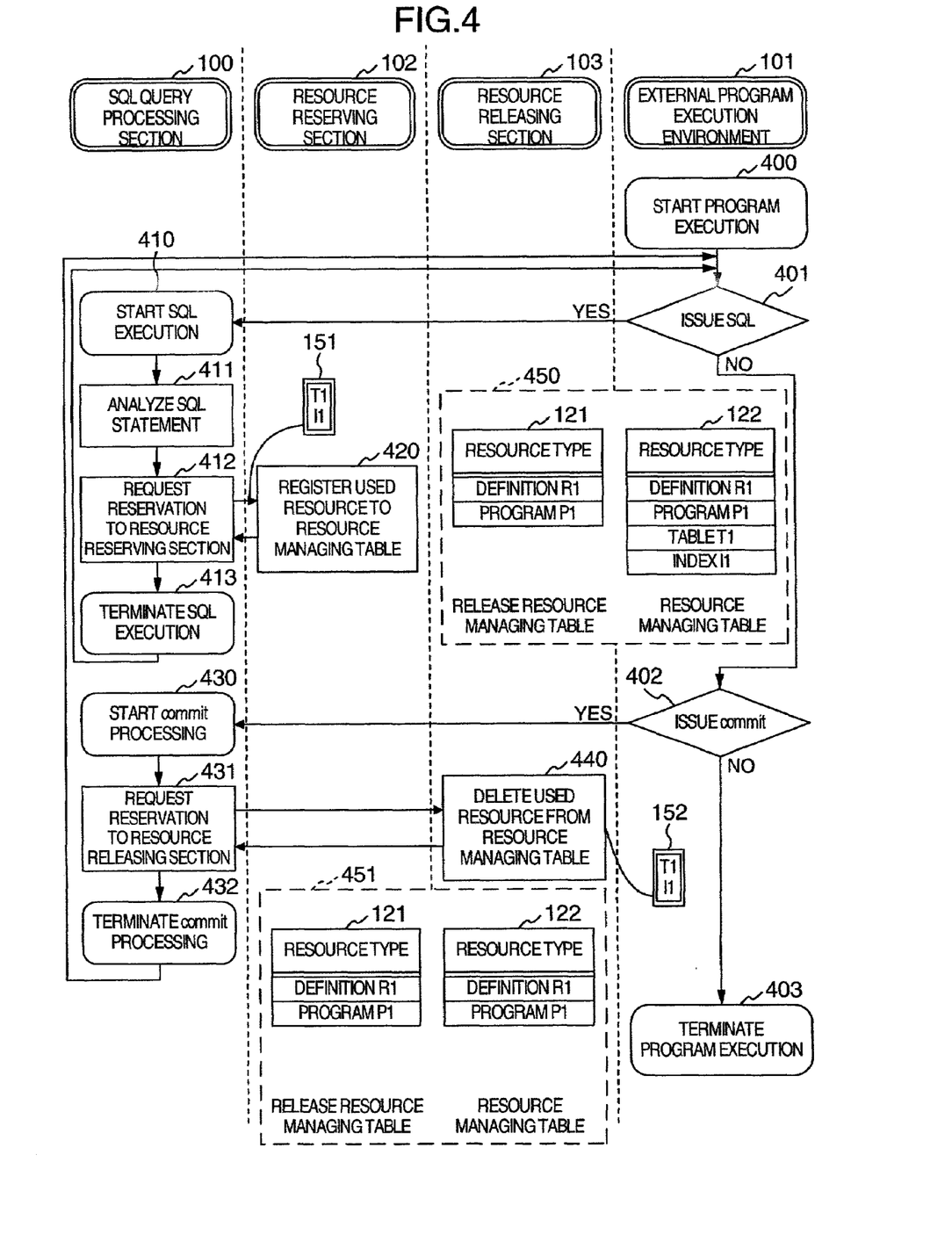
FIG. 4 is a flowchart showing in detail step 330 of FIG. 3, namely, in which the external program execution environment of the embodiment executes processing of a program and calls the SQL query processing section.

FIG. 4 shows details of step 330 of FIG. 3 in a flowchart. Specifically, the external program execution environment 101 in the embodiment of FIG. 1 executes processing of a program 133, issues a select statement 134 and a commit statement, and calls the SQL query processing section 100. Steps 410 to 413 and steps 430 to 432 are executed by the SQL query processing section 100, step 420 is executed by the resource reserving section 102, step 440 is executed by the resource releasing section 103, and steps 400 to 403 are executed by the external program execution environment 101.

First, in step 401, the external program execution environment 101 determines whether or not a SQL statement has been issued from a program. If this is the case, control goes to step 410 to start SQL execution processing. In step 411, the SQL query processing section 100 analyzes an issued SQL statement. As a result of the analysis, the section 100 determines a resource type 151 of a resource necessary to execute the SQL statement. In step 412, the SQL query processing section 100 passes as a parameter the resource type 151 to the resource reserving section 102 to thereby issue a resource reservation request. In response thereto, the section 102 registers the resource type received as a parameter to the resource managing table 122. As a result, in the resource managing table 122, "table T1" and "index I1" are added as items of the resource type 151 to the state 340 of FIG. 3. That is, four items "definition R1", "program P1", "table T1", and "index I1" are kept as items of the resource type 151 as indicated by a reference numeral 450 in FIG. 4. After the execution of steps 411 and 412, the SQL query processing section 100 terminates the SQL statement execution processing, and then control returns to the external program execution environment 101.

In step 401, if the SQL statement has not been issued, control goes to step 402. In step 402, the external program execution environment 101 determines whether or not a commit statement has been issued from a program 133. If the commit statement has been issued, control goes to step 430 to start processing of the commit statement. In step 431, the SQL query processing section 100 issues a resource release request to the resource releasing section 103. In response thereto, the section 103 refers to the release resource managing table 121 and the resource managing table 122 to determine a resource type 152 to be released. In this situation, resources "table T1" and "index I1" which are kept in the resource managing table 122 and which are not kept in the release resource managing table 121 in the state indicated by a reference numeral 450 are determined to be deleted, and hence, a resource type 152 is determined to be released. The resource releasing section 103 then deletes the items of the resource type 152 from the resource managing table 122. As a result, "table T1" and "index I1" as the resource type 152 are deleted from the resource managing table 122 as indicated by a reference numeral 451 in FIG. 4. That is, only "definition R1" and "program P1" are kept remained therein. After the execution of step 431, the SQL query processing section 100 terminates the commit statement processing and then control returns to step 401 of the external program execution environment 101.

In step 402, if the commit statement has not been issued, the program execution processing is terminated. Through the above procedure, the program execution processing is conducted in the external program execution environment 101.

The processing of the flowcharts shown above is executed as programs in the computer system 200 shown in FIG. 2. However, it is not restricted that the programs are stored in an external storage physically externally connected to the computer system 200 as shown in FIG. 2. The programs may be stored on computer-readable storage media such as a hard disk and/or a floppy disk for which the computer system 200 can conduct read and write operations. Moreover, the programs may be stored via a network in an external storage of another computer system different from the computer system 2 of FIG. 2.

In the above embodiments, non-releasable database resources are kept in the release resource managing table 121. However, the release resource managing table 121 may be omitted. By adding information indicating a non-releasable state to the resource managing table 122, information of non-releasable database resources can be obtained from the table 122.

In the description of the present invention, although the commit statement is used as an example, a rollback statement may also be used in a similar fashion.

According to the present invention, the transaction completion can be conducted during the program execution. Therefore, for a user who conducts database processing can use, directly as a routine call program, a program including transactions. This increases portability and hence enhances the advantage of the stored program function.

According to the present invention, database resources which can be used by another program can be appropriately released.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. A database management method in a database management system which comprises storages, an SQL execution environment which receives a query request to a database stored in said storage and performs a data operation to said database based on the received query request, a resource reserving unit which reserves resources used by said SQL execution environment, a resource releasing unit which releases the resources used by the SQL execution environment, and a program execution environment which communicates with said SQL execution environment, said database management method comprising the steps of:

storing in said storages, a program execution module executed by said SQL execution environment, an SQL execution module, an SQL execution termination module, and programs executed by said program execution environment;

by said SQL execution environment, in response to an input of the query request, referring to a dictionary of management information for the database stored in the storage to acquire a program execution module specified by said query request and definition information referred to by the specified program execution module and determine a program to be executed among said programs;

passing a resource reserving request to said resource reserving unit, said resource reserving request including information for reserving a resource type corresponding to a resource to be used in a program execution process executed by said program execution module as a resource which is non-releasable until process termination of said query request;

by said resource reserving unit, in response to an input of the passed resource reserving request, analyzing the input resource reserving request, resultantly finding that the resource represented by said resource type is non-releasable until the process termination of said query request, and registering said resource type both in a release resource managing table and a resource managing table stored in said storage;

by said SQL execution environment, starting the program execution process by referring to said storages and executing the program execution module referred to thereby, and passing by said program execution process, an execution request of said program preset in said program execution module to said program execution environment;

by said program execution environment, in response to an input of said program execution request, starting a data operation process by referring to said storages and executing said program referred to thereby, and passing by said started data operation process, a data operation request preset in said program to the SQL execution environment;

by said SQL execution environment, determining the SQL execution module corresponding to said passed data operation request, and passing to said resource reserving unit a resource reserving request, said resource reserving request being to reserve as a resource which is non-releasable until the processing of the data operation request is terminated, a resource type corresponding to said resource used in said SQL execution module;

by said resource reserving unit, in response to an input of the passed resource reserving request, analyzing the input resource reserving request, resultantly finding that the resource represented by said resource type is non-releasable until the processing of said data operation request is terminated, and registering said resource type in the resource managing table without registering in the release resource managing table;

by said SQL execution environment, executing the SQL execution module determined by referring to the storage;

in a data operation terminating process preset in the execution program, passing to said SQL execution environment, a data operation terminating request representing process termination of the data operation;

by said SQL execution environment, in response to an input of the passed data operation terminating request, executing a SQL execution terminating module corresponding to the data operation terminating request by reference to said storage, and passing to the resource releasing unit, a resource releasing request as a result of execution of the SQL execution terminating module, said resource releasing request being to release the resource used in execution of the SQL execution module; and by said resource releasing unit, in response to an input of the passed resource releasing request, analyzing the input resource releasing request, resultantly finding that the input resource releasing request represents release of the resource used in execution of the SQL execution module, thereby referring to the release resource managing table and the resource managing table to extract a resource to be released which is registered in the resource managing table but not registered in the release resource managing table, and deleting a resource type matching with the extracted resource, from the resource managing table and keeping to hold an unmatched resource type, whereby the resource to be released and used by the SQL execution module is released and the resource used by the program execution module is kept stored.

2. A computer program stored on a storage medium for conducting database management in a database management system which comprises storages, an SQL execution environment which receives a query request to a database stored in said storage and performs a data operation to said database based on the received query request, a resource reserving unit which reserves resources used by said SQL execution environment, a resource releasing unit which releases the resources used by the SQL execution environment, and a program execution environment which communicates with said SQL execution environment, said computer program, when executed causes said database management system to perform the steps of:

storing in said storages, a program execution module executed by said SQL execution environment, an SQL execution module, an SQL execution termination module, and programs executed by said program execution environment;

by said SQL execution environment, in response to an input of the query request, referring to a dictionary of management information for the database stored in the storage to acquire a program execution module specified by said query request and definition information referred to by the specified program execution module and determine a program to be executed among said programs;

passing a resource reserving request to said resource reserving unit, said resource reserving request including information for reserving a resource type corresponding to a resource to be used in a program execution process executed by said program execution module as a resource which is non-releasable until process termination of said query request;

by said resource reserving unit, in response to an input of the passed resource reserving request, analyzing the input resource reserving request, resultantly finding that the resource represented by said resource type is non-releasable until the process termination of said query request, and registering said resource type both in a release resource managing table and a resource managing table stored in said storage;

by said SQL execution environment, starting the program execution process by referring to said storages and executing the program execution module referred to thereby, and passing by said program execution process, an execution request of said program preset in said program execution module to said program execution environment;

by said program execution environment, in response to an input of said program execution request, starting a data operation process by referring to said storages and executing said program referred to thereby, and passing by said started data operation process, a data operation request preset in said program to the SQL execution environment;

by said SQL execution environment, determining the SQL execution module corresponding to said passed data operation request, and passing to said resource reserving unit a resource reserving request, said resource reserving request being to reserve as a resource which is non-releasable until the processing of the data operation request is terminated, a resource type corresponding to said resource used in said SQL execution module;

by said resource reserving unit, in response to an input of the passed resource reserving request, analyzing the input resource reserving request, resultantly finding that the resource represented by said resource type is non-releasable until the processing of said data operation request is terminated, and registering said resource type in the resource managing table without registering in the release resource managing table;

by said SQL execution environment, executing the SQL execution module determined by referring to the storage;

in a data operation terminating process preset in the execution program, passing to said SQL execution environment, a data operation terminating request representing process termination of the data operation;

by said SQL execution environment, in response to an input of the passed data operation terminating request, executing a SQL execution terminating module corresponding to the data operation terminating request by reference to said storage, and passing to the resource releasing unit, a resource releasing request as a result of execution of the SQL execution terminating module, said resource releasing request being to release the resource used in execution of the SQL execution module; and by said resource releasing unit, in response to an input of the passed resource releasing request, analyzing the input resource releasing request, resultantly finding that the input resource releasing request represents release of the resource used in execution of the SQL execution module, thereby referring to the release resource managing table and the resource managing table to extract a resource to be released which is registered in the resource managing table but not registered in the release resource managing table, and deleting a resource type matching with the extracted resource, from the resource managing table and keeping to hold an unmatched resource type, whereby the resource to be released and used by the SQL execution module is released and the resource used by the program execution module is kept stored.

3. A database management system comprising:

a plurality of storages for storing data;

a SQL execution environment which receives a query request to a database stored in a storage and performs a data operation to said database based on the received query request;

a resource reserving unit which reserves resources used by said SQL execution environment;

a resource releasing unit which releases the resources used by the SQL execution environment; and a program execution environment which communicates with said SQL execution environment, wherein said storages has stored therein a program execution module executed by said SQL execution environment, an SQL execution module, an SQL execution termination module, and programs executed by said program execution environment, wherein said SQL execution environment, in response to an input of the query request, refers to a dictionary of management information for the database stored in the storage to acquire a program execution module specified by said query request and definition information referred to by the specified program execution module and determines a program to be executed among said programs, wherein a resource reserving request is transmitted to said resource reserving unit, said resource reserving request including information for reserving a resource type corresponding to a resource to be used in a program execution process executed by said program execution module as a resource which is non-releasable until process termination of said query request, wherein said resource reserving unit, in response to an input of the passed resource reserving request, analyzes the input resource reserving request, resultantly finds that the resource represented by said resource type is non-releasable until the process termination of said query request, and registers said resource type both in a release resource managing table and a resource managing table stored in said storage, wherein said SQL execution environment, starts the program execution process by referring to said storages and executes the program execution module referred to thereby, wherein said program execution process transmits an execution request of said program preset in said program execution module to said program execution environment, wherein said program execution environment, in response to an input of said program execution request, starts a data operation process by referring to said storages and executes said program referred to thereby, wherein said started data operation process, transmits a data operation request preset in said program to the SQL execution environment, wherein said SQL execution environment, determines the SQL execution module corresponding to said transmitted data operation request, and transmits to said resource reserving unit a resource reserving request, said resource reserving request being to reserve as a resource which is non-releasable until the processing of the data operation request is terminated, a resource type corresponding to said resource used in said SQL execution module, wherein said resource reserving unit, in response to an input of the transmitted resource reserving request, analyzes the input resource reserving request, resultantly finds that the resource represented by said resource type is non-releasable until the processing of said data operation request is terminated, and registers said resource type in the resource managing table without registering in the release resource managing table, wherein said SQL execution environment, executes the SQL execution module determined by referring to the storage, wherein a data operation terminating process preset in the execution program, transmits to said SQL execution environment, a data operation terminating request representing process termination of the data operation;

wherein said SQL execution environment, in response to an input of the passed data operation terminating request, executes a SQL execution terminating module corresponding to the data operation terminating request by reference to said storage, and transmits to the resource releasing unit, a resource releasing request as a result of execution of the SQL execution terminating module, said resource releasing request being to release the resource used in execution of the SQL execution module, and wherein said resource releasing unit, in response to an input of the transmitted resource releasing request, analyzes the input resource releasing request, resultantly finds that the input resource releasing request represents release of the resource used in execution of the SQL execution module, thereby referring to the release resource managing table and the resource managing table to extract a resource to be released which is registered in the resource managing table but not registered in the release resource managing table, and deletes a resource type matching with the extracted resource, from the resource managing table and keeps to hold an unmatched resource type, whereby the resource to be released and used by the SQL execution module is released and the resource used by the program execution module is kept stored.

* * * * *